(12) United States Patent
Anderson et al.

(10) Patent No.: US 9,317,337 B2
(45) Date of Patent: Apr. 19, 2016

(54) UTILIZING SOFTWARE COMPONENT METADATA TO PROVISION VIRTUAL MACHINES IN A NETWORKED COMPUTING ENVIRONMENT

(75) Inventors: Jason L. Anderson, San Jose, CA (US); Gregory J. Boss, Saginaw, MI (US); Jeffrey L. Coveyduc, San Jose, CA (US); Christopher W. Roach, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 13/446,058

(22) Filed: Apr. 13, 2012

(65) Prior Publication Data

US 2013/0275961 A1    Oct. 17, 2013

(51) Int. Cl.
*G06F 9/445* (2006.01)
*G06F 9/50* (2006.01)

(52) U.S. Cl.
CPC ................... *G06F 9/5072* (2013.01)

(58) Field of Classification Search
USPC ........................................................ 717/177
See application file for complete search history.

(56) References Cited

U.S. PATENT DOCUMENTS

| | | | |
|---|---|---|---|
| 5,093,912 A | 3/1992 | Dong et al. | |
| 7,516,457 B2 | 4/2009 | Eilam et al. | |
| 7,577,722 B1 | 8/2009 | Khandekar et al. | |
| 7,809,831 B2 | 10/2010 | Matsumsitsu et al. | |
| 7,996,525 B2 | 8/2011 | Stienhans et al. | |
| 2006/0159014 A1 | 7/2006 | Breiter et al. | |
| 2007/0214455 A1 | 9/2007 | Williams et al. | |
| 2008/0209016 A1* | 8/2008 | Karve et al. | 709/221 |
| 2008/0263553 A1* | 10/2008 | Lueck et al. | 718/102 |
| 2009/0276771 A1 | 11/2009 | Nickolov et al. | |
| 2010/0042670 A1 | 2/2010 | Kamalakantha et al. | |
| 2010/0058342 A1* | 3/2010 | Machida | 718/1 |
| 2010/0115621 A1* | 5/2010 | Staniford | H04L 63/1416 726/25 |
| 2011/0138047 A1 | 6/2011 | Brown et al. | |
| 2011/0145392 A1 | 6/2011 | Dawson et al. | |
| 2012/0041844 A1* | 2/2012 | Shen et al. | 705/26.61 |
| 2012/0042061 A1* | 2/2012 | Ayala et al. | 709/224 |
| 2012/0054731 A1* | 3/2012 | Aravamudan et al. | 717/170 |

OTHER PUBLICATIONS

Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.
Maitland, J., "Keeping Control Isn't Easy", Chapter 4: Cloud-Based Infrastructure, SearchCloudComputing.com, Publication Date: Oct. 2009, 17 pages.

* cited by examiner

*Primary Examiner* — Li B Zhen
*Assistant Examiner* — Sen Chen
(74) *Attorney, Agent, or Firm* — Noah A. Sharkan; Hunter E. Webb; Keohane & D'Alessandro PLLC (57) ABSTRACT

Embodiments of the present invention provide a set of algorithmic methods that can be used to generate a pre-provisioned pool of virtual machines (VMs) in a networked computing environment. Specifically, an install time for possible combinations of software components of a VM in a plurality of software component combinations is calculated. Each respective install time is weighted by a value associated with a provisioning history of software components. At least part of the software component combinations is allocated to the pre-provisioned pool of virtual machines (VMs).

20 Claims, 6 Drawing Sheets

UTILIZING SOFTWARE COMPONENT METADATA TO PROVISION VIRTUAL MACHINES IN A NETWORKED COMPUTING ENVIRONMENT

TECHNICAL FIELD

In general, the present invention relates to the improvement of provisioning times of virtual machines (VMs) in a networked computing environment (e.g., a cloud computing environment). Specifically, the present invention relates to utilizing software component metadata to provision virtual machines in a networked computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Cloud computing services are typically rendered within a relatively static hardware pool whereby operating systems and applications are deployed and reconfigured to meet the computational demands of consumers. Within the cloud environment's boundaries, application images can be installed and overwritten, Internet Protocol (IP) addresses may be modified, and real and virtual processors/machines may be allocated to meet changing business needs. Presently, different cloud service providers may take varying amounts of time to provision virtual machines requested by consumers. For example, some cloud providers may provision a particular resource very quickly, while others may take longer. As such, challenges may exist in achieving consistent computing resource provisioning times.

SUMMARY

Embodiments of the present invention provide a set of algorithmic methods that can be used to generate a pre-provisioned pool of virtual machines (VMs) in a networked computing environment. Specifically, an install time for possible combinations of software components of a VM in a plurality of software component combinations is calculated. Each respective install time is weighted by a value associated with a provisioning history of software components. At least part of the software component combinations is allocated to the pre-provisioned pool of virtual machines (VMs).

A first aspect of the present invention provides a computer-implemented method for generating a pre-provisioned pool of virtual machines (VMs) in a networked computing environment, comprising: calculating an install time for each software component combination in a plurality of software component combinations; weighting each respective install time by a value associated with a provisioning history; and allocating at least part of the software component combinations to the pre-provisioned pool of virtual machines (VMs).

A second aspect of the present invention provides a system for generating a pre-provisioned pool of virtual machines (VMs) in a networked computing environment, comprising: a memory medium comprising instructions; a bus coupled to the memory medium; and a processor coupled to the bus that when executing the instructions causes the system to: calculate an install time for each software component combination in a plurality of software component combinations; weight each respective install time by a value associated with a provisioning history; and allocate at least part of the software component combinations to the pre-provisioned pool of virtual machines (VMs).

A third aspect of the present invention provides a computer program product for generating a pre-provisioned pool of virtual machines (VMs) in a networked computing environment, the computer program product comprising a computer readable storage media, and program instructions stored on the computer readable storage media, to: calculate an install time for each software component combination in a plurality of software component combinations; weight each respective install time by a value associated with a provisioning history; and allocate at least part of the software component combinations to the pre-provisioned pool of virtual machines (VMs).

A fourth aspect of the present invention provides a method for deploying a system for generating a pre-provisioned pool of virtual machines (VMs) in a networked computing environment, comprising: deploying computer infrastructure being operable to: calculate an install time for each software component combination in a plurality of software component combinations; weight each respective install time by a value associated with a provisioning history; and allocate at least part of the software component combinations to the pre-provisioned pool of virtual machines (VMs).

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide a set of algorithmic methods that can be used to generate a pre-provisioned pool of virtual machines (VMs) in a networked computing environment. Specifically, an install time for possible combinations of software components of a VM in a plurality of software component combinations is calculated. Each respective install time is weighted by a value associated with a provisioning history of software components. At least part of the software component combinations is allocated to the pre-provisioned pool of virtual machines (VMs).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
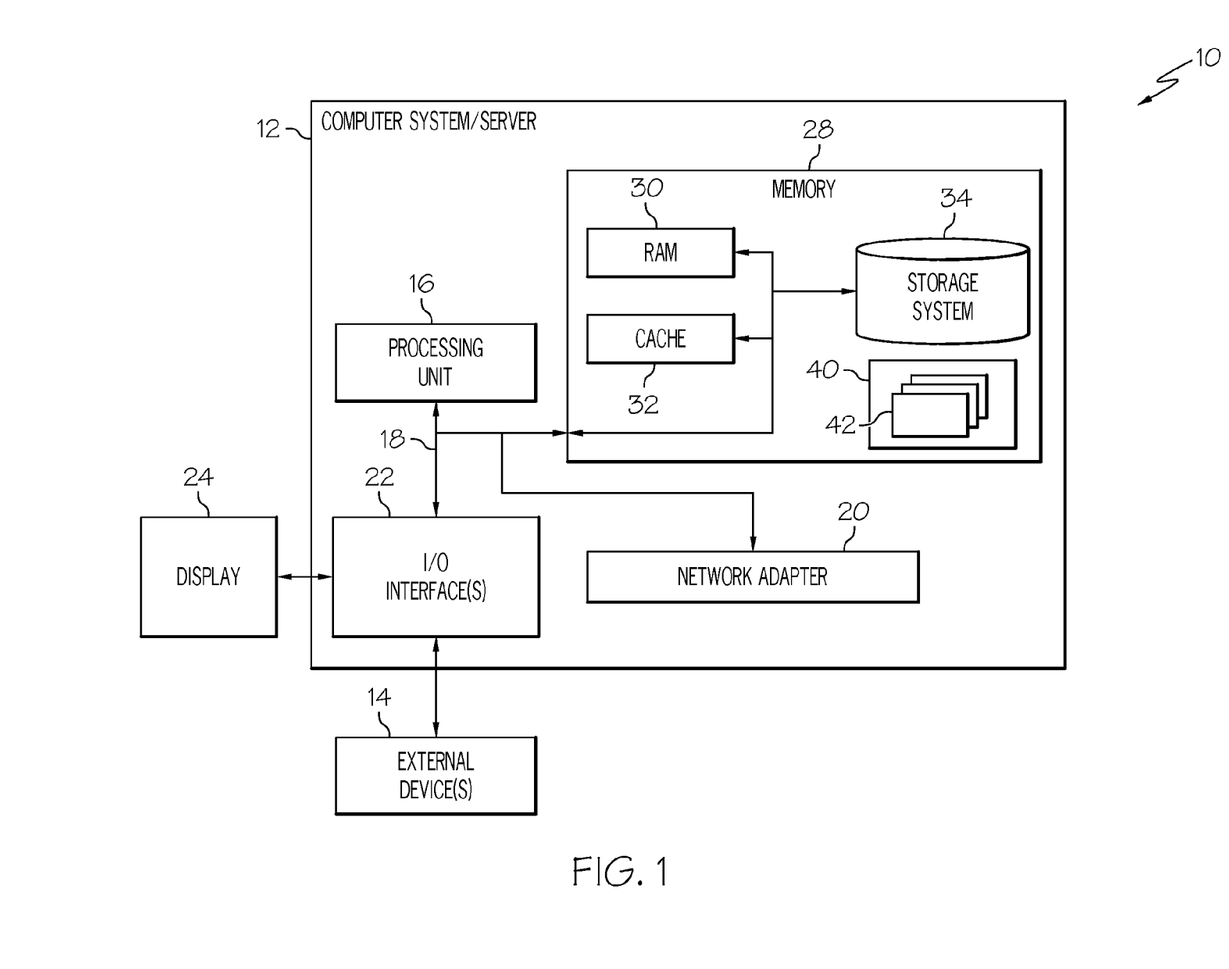
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
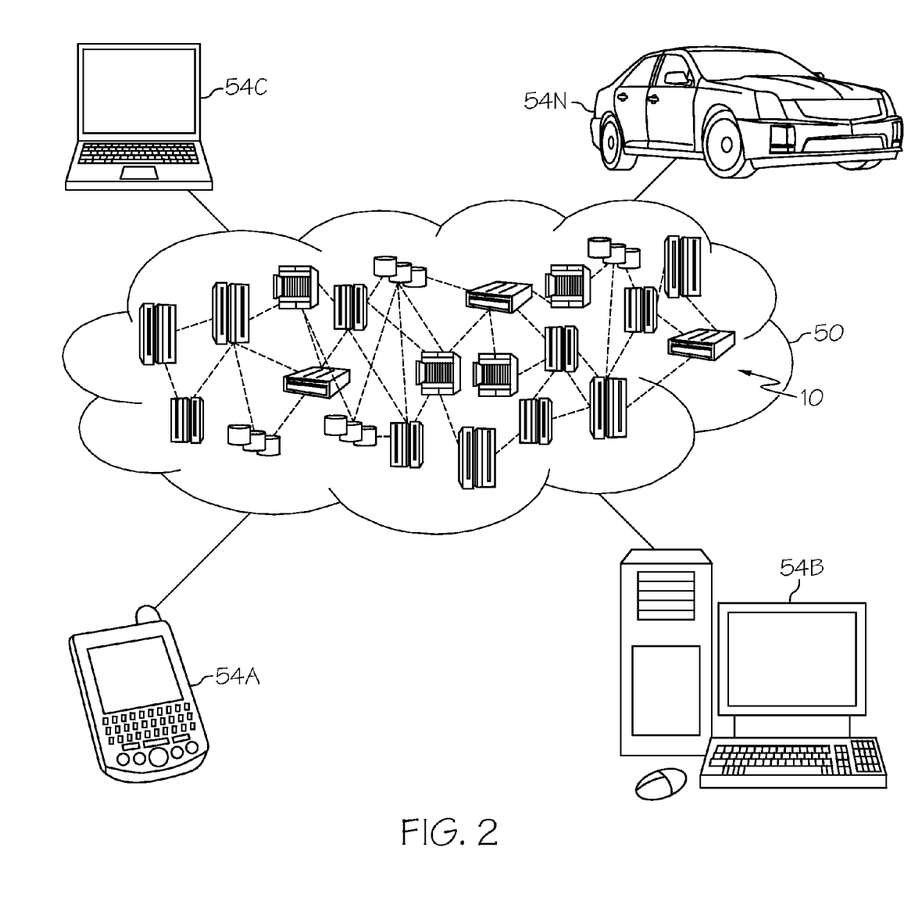
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
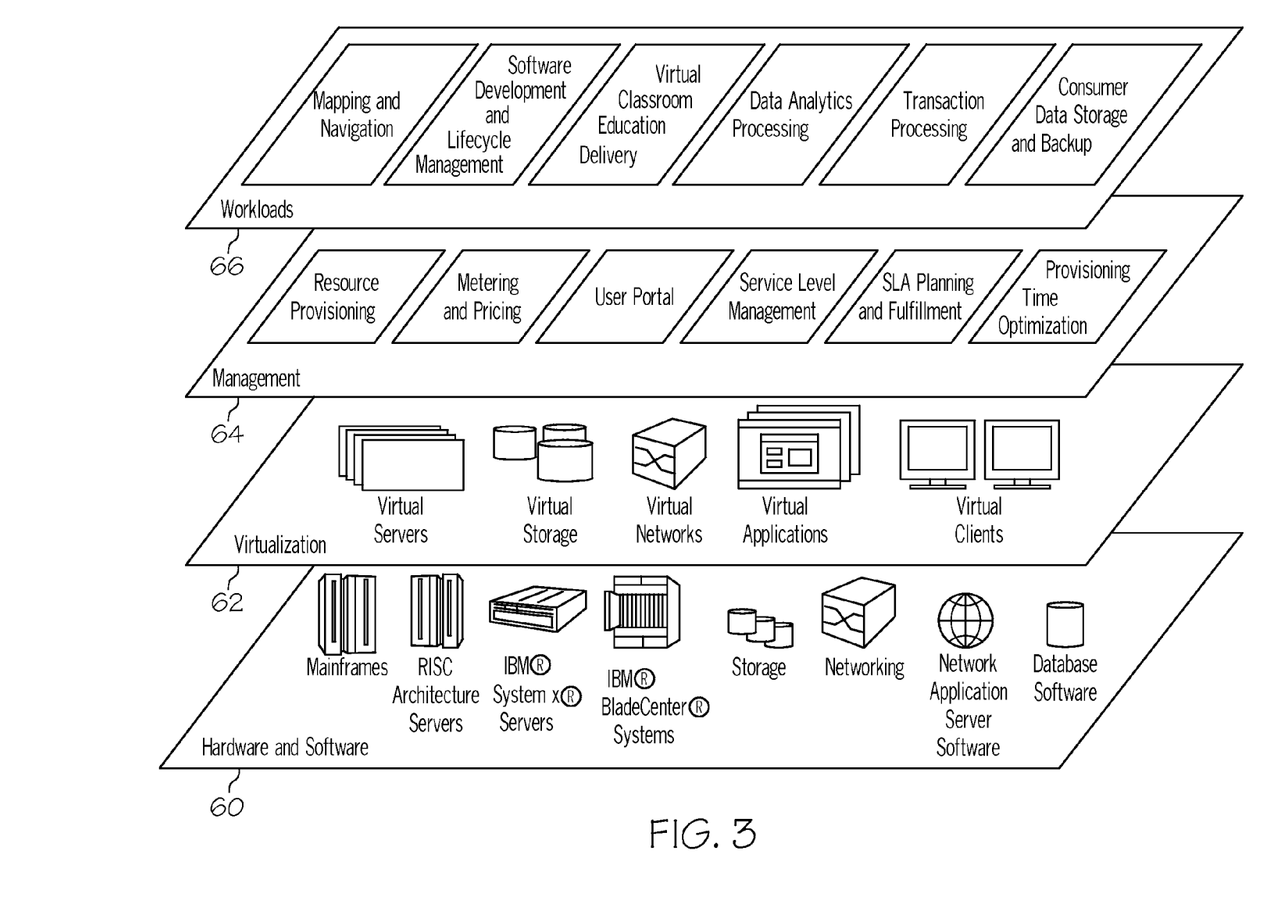
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is provisioning time optimization, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the virtual machine selection functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
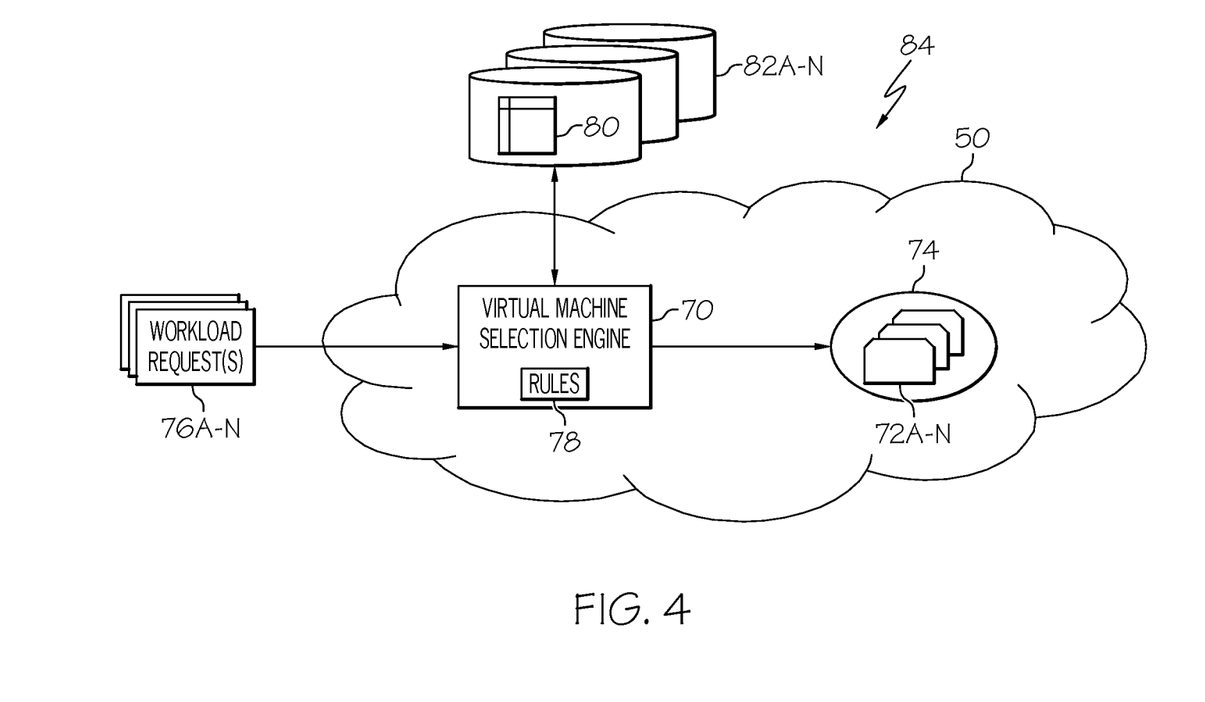
FIG. 4 depicts a system diagram according to an embodiment of the present invention.

Referring now to FIG. 4, a system diagram according to an aspect of the present invention is shown. As depicted, a virtual machine pooling engine (engine 70) is shown within networked computing environment 84 (e.g., comprising cloud computing environment 50). In general, engine 70 can be implemented as program 40 on computer system 12 of FIG. 1 and can implement the functions recited herein as depicted in management layer 64 of FIG. 3. In general, engine 70 (in one embodiment) comprises a rules and/or computational engine that processes a set (at least one) of rules 78 and/or performs a set of computations to select a set of VMs 72A-N from a pool of pre-provisioned VMs (pool 74) to process/handle one or more workload requests 76A-N. Along these lines, engine 70 may perform functions similar to a general-purpose computer.

Along these lines, engine 70 may perform multiple functions using rules 78. Specifically, among other functions, engine 70 may: calculate an install time for each software component (e.g., software program) combination in a plurality of software component combinations; weight each respective install time by a value associated with a provisioning history; and allocate at least part of the software component combinations to the pre-provisioned pool of virtual machines (VMs).

The functions of engine 70 will now be explained in further detail. Under the embodiments of the present invention, there are multiple methods/approaches that can be implemented to generate a pool 74 of (e.g., at least partially) pre-provisioned VMs 72A-N. Assume cloud environment 50 comprises a pool 74 of (e.g., at least partially) pre-provisioned VMs 72A-N. Further assume that some provisioning history and ratings data 80 exists for the partially pre-provisioned VMs 72A-N (e.g., in a set of databases 82A-N or the like). Multiple methods/approaches can be implemented to identify which VMs 72A-N in pool 74 comprise the software component(s) utilized to process workload requests 76A-N. In the example set forth below, it will be assumed that up to three possible software components (e.g., software programs) are provided and/or are utilized, namely, software components "A", "B", and "C" (or any combination thereof). However, this need not be the case and it is understood that software components "A", B", and "C" are cited for illustrative purposes only.

This disclosure introduces a method to generate a pool of (e.g., at least partially) pre-provisioned VMs 72A-N which is optimally allocated in respect to the time it takes to fulfill VM requests. The method calculates the time to go from each combination of software components to every other combination of software components. The total transition time for each respective software component combination represents its install time. This install time is then weighted by the distribution of all prior provisioning requests. In other words, for each time calculation, the likelihood that the user would request a VM with that respective final software component configuration is used to weight the install time for the configuration. This method is advantageous because it optimally finds the best pre-provision distribution of VMs based on their relative install times.

In a first embodiment, the method calculates the transition time from every possible software component combination to every other software component combination. In a second embodiment, only a subset of transition times is calculated rather than a transition time for every possible software component combination. This embodiment reduces the complexity by limiting the number of software component combinations used in the transition time calculations. This method will provide near-optimal results which are calculated quickly as compared to traditional methods.

In another embodiment, a genetic algorithm is used when generating the pre-provisioning pool to overcome the complexity created by large service catalogs. Presently, cloud providers can take as much as several hours to provision resources requested by consumers. Some cloud systems can take as little as a few minutes. The differences in provisioning speed generally lie in three areas: (1) how much investment is made in the back storage architecture; (2) the architecture of the cloud management platform; and (3) the methods used to provision resources. Some clouds necessarily take longer to provision because the service provider has chosen not to invest in expensive back-end storage technologies, while others take longer because of requirements leveraged by consumers which require complex provisioning methods.

Genetic algorithms evolve solutions to problems using principles of natural selection. Generally, a genetic algorithm starts with a population of attempted solutions to a problem, evaluates the attempted solutions, and uses the better solutions as the basis of a next generation of attempted solutions. Typically, the process continues until some satisfactory solution emerges. Random software component combinations are selected for a fitness evaluation. Combinations that do well in the fitness evaluation are added to the provisioning pool. In one example, the genetic algorithm may have constraints. Constraints are requirements that a software component combination must meet in order to qualify for a fitness testing. By removing combinations which don't meet certain requirements before running fitness evaluations, the system may save time by not pursuing unusable solutions.

The following fitness evaluation function does one execution of the genetic algorithm process (including multiple generations) to find the fittest partially pre-provisioned individual. The fitness evaluation function of the genetic algorithm may be shown as follows:

```
gaFitnessFunction(softwareConfiguration x,
probDistOfSoftwareConfig):
    totalToCost = 0
    for each software installable combination y do:
        totalToCost += timeToInstall(x,y) * P(y)
    end for loop
    return totalToCost
```

In order to keep the resulting pre-provisioned pool diverse, each time a software component is placed into the pool, an instance of that combination is removed. This way, the resulting percentage of that configuration is reduced, and the next time the genetic algorithm is executed, that configuration's weight will be less. The method represents software installable combinations as BitSets for each individual combination in the genetic population. For instance, a possible software installable configuration may be represented in the following way: $1001110=S_1S_2S_3S_4S_5S_6S_7$. The generic algorithm to return a pool is shown below:

```
pool = BitSet[ ]
probDistOfSoftwareConfig =
    getCurrentProbDistOfSoftwareInstallables( )
```

-continued

```
for i=1 to n number of VMs in the resulting pool do:
    pool[i] = chooseOneGA(probDistOfSoftwareConfig)
    probDistOfSoftwareConfig.removeOneInstance(pool[i])
end for loop
return pool
```

Figure 5:
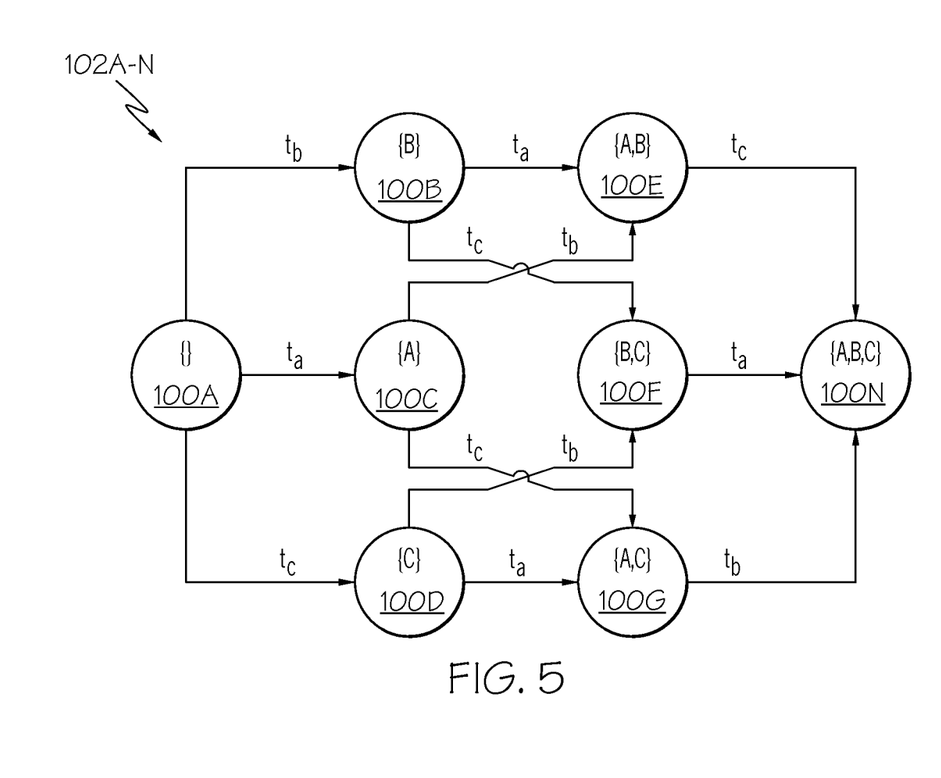
FIG. 5 depicts an install graph according to an embodiment of the present invention.

This concept is shown in greater detail in FIG. 5. As depicted, the graph of FIG. 5 shows VMs 100A-N having some combination of software components "A", "B", and/or "C". Also shown are various traversal paths 102A-N with associate times "$t_x$" to obtain all three software components "A", "B", and "C". For example, beginning at VM 100A (null set), one possible route for obtaining all three software components as shown in node 100N is to traverse path $t_b$ to VM 100B, then path $t_a$ to VM 100E, and then path $t_c$ to VM 100N. As further shown, multiple paths from VM 100A to VM 100N could be followed.

Consider the example in which software components A has a software component installation time of 5 minutes and software component B has a software component installation time of 30 minutes. It would be much faster to provision an 'A and B' VM beginning with a B VM instead of an A VM.

The following example 'timeToInstall' algorithm may be used to calculate the install time of each software component:

```
timeToInstall(startConfig, endConfig):
    if startConfig has software not found in endConfig then:
        // Do not allow uninstalls so start from beginning
        startConfig = { }
    end if
    installTime = 0
    for each software component s in endConfig do:
        if startConfig does not contain s then:
            installTime += ts
        end if
    end for loop
    return installTime
```

The variable startConfig represents the beginning of the install time for the respective software component configuration. The variable endConfig represents the end of the install time for the respective software component configuration. The total time for installation (installTime) is returned by the algorithm.

In some embodiments, the 'timeToInstall' function does not account for uninstalling software components from a partially provisioned VM to fulfill requests since residual software components might still exist after the software is uninstalled. In other embodiments, uninstalls may be incorporated into the algorithm by including the uninstall times for each software component. The algorithm would then take the minimum distance on the graph depicted in FIG. 1.

In each of the embodiments described above, each install time is then weighted by the percentage of each software component combination being previously provisioned. In other words, the time calculation for each software component configuration is weighted by the likelihood that the user would request a VM with that final software component configuration. When weighting the likelihood, simple P (softwareConfig) probabilities are used. In other words, out of all the previously provisioned instances, the weighting is based on the percentage that was exclusively softwareConfig. The following 'totalToCost' algorithm may be used to select a VM based on distribution in order to generate a pool of (e.g., at least partially) pre-provisioned VMs 72A-N:

```
totalToCost = int[ ]
for each software component combination x do:
    for each software component combination y do:
        totalToCost[x] += timeToInstall(x,y) * P(y)
    end for loop
end for loop
reciprocalToCost = reciprocate(totalToCost)
normalizedReciprocalToCost = normalize(reciprocalToCost)
selectVMPoolBasedOnDistribution(normalizedReciprocalToCost)
```

Figure 6:
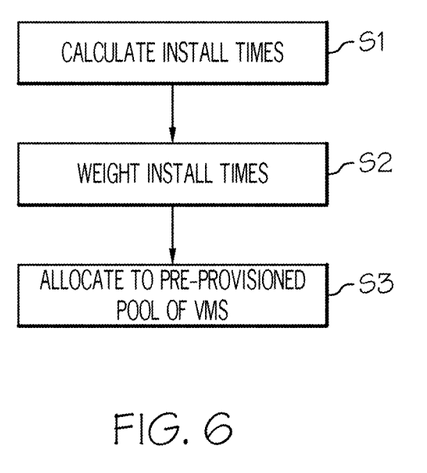
FIG. 6 depicts a method flow diagram according to an embodiment of the present invention.

Referring now to FIG. 6, a method flow diagram according to an embodiment of the present invention is shown. As depicted, in step S1, an install time for each software component combination is calculated. In step S2, each respective install time is weighted by a value associated with a provisioning history. In step S3, at least part of the software component combinations is allocated to the pre-provisioned pool of virtual machines (VMs).

While shown and described herein as a pre-provisioned VM pool generation solution, it is understood that the invention further provides various alternative embodiments. For example, in one embodiment, the invention provides a computer-readable/useable medium that includes computer program code to enable a computer infrastructure to provide pre-provisioned VM pool generation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide pre-provisioned VM pool generation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for generating a pool of (e.g., at least partially) pre-provisioned VMs. In this case, a computer infrastructure, such as computer system 12 (FIG. 1), can be provided, and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method to generate a pre-provisioned pool of virtual machines (VMs) in a networked computing environment, comprising:

calculating an install time for each software component combination in a plurality of software component combinations, the install time including an amount of time necessary to uninstall the software components from a partially provisioned VM of which the software components form a subset of VM software components and to transition the software components to a VM having the software component combination having a first plurality of software components from the partially provisioned VM having a different software component combination having a second plurality of software components that is different from the first plurality of software components;

weighting each respective install time by a numerical value that indicates a probability, with respect to other software component combinations, that the software component combination will be requested based on a provisioning history;

allocating, prior to a request for software components, at least part of the first plurality of software components in the software component combinations to the pre-provisioned pool of virtual machines (VMs) based on the install time and the weighting; and maintaining diversity in the pre-provisioned pool of VMs by removing, in response to the allocating of the at least part of the first plurality of software components to the pre-provisioned pool of VMs, a VM instance having a different combination of software components from the allocated at least part of the first plurality of software components that has the first plurality of software components forming a subset of the different combination of software components from the pre-provisioned pool of VMs.

2. The computer-implemented method of claim 1, the value associated with the provisioning history comprising a percentage of prior provisioning requests for the respective software component combination out of all prior provisioning requests.

3. The computer-implemented method of claim 1, the plurality of software component combinations comprising all possible software component combinations.

4. The computer-implemented method of claim 1, the plurality of software component combinations comprising a subset of all possible software component combinations, wherein the subset is randomly selected.

5. The computer-implemented method of claim 4, further comprising performing a genetic algorithm on the subset of software component combinations that starts with a population of attempted solutions to a problem, evaluates the attempted solutions, and uses better solutions as the basis of a next generation of attempted solutions.

6. The computer-implemented method of claim 1, the networked computing environment comprising a cloud computing environment.

7. A system for generating a pre-provisioned pool of virtual machines (VMs) in a networked computing environment, comprising:
a memory medium comprising instructions;
a bus coupled to the memory medium; and
a processor coupled to the bus that when executing the instructions causes the system to:
calculate an install time for each software component combination in a plurality of software component combinations, the install time including an amount of time necessary to uninstall the software components from a partially provisioned VM of which the software components form a subset of VM software components and to transition the software components to a VM having the software component combination having a first plurality of software components from the partially provisioned VM having a different software component combination having a second plurality of software components that is different from the first plurality of software components;
weight each respective install time by a numerical value that indicates a probability, with respect to other software component combinations, that the software component combination will be requested based on a provisioning history;
allocate, prior to a request for software components, at least part of the first plurality of software components in the software component combinations to the pre-provisioned pool of virtual machines (VMs) based on the install time and the weight; and
maintain diversity in the pre-provisioned pool of VMs by removing, in response to the allocating of the at least part of the first plurality of software components to the pre-provisioned pool of VMs, a VM instance having a different combination of software components from the allocated at least part of the first plurality of software components that has the first plurality of software components forming a subset of the different combination of software components from the pre-provisioned pool of VMs.

8. The system of claim 7, the value associated with the provisioning history comprising a percentage of prior provisioning requests for the respective software component combination out of all prior provisioning requests.

9. The system of claim 7, the plurality of software component combinations comprising all possible software component combinations.

10. The system of claim 7, the plurality of software component combinations comprising a subset of all possible software component combinations, wherein the subset is randomly selected.

11. The system of claim 10, the memory medium further comprising instructions for causing the system to perform a genetic algorithm on the subset of software component combinations that starts with a population of attempted solutions to a problem, evaluates the attempted solutions, and uses better solutions as the basis of a next generation of attempted solutions.

12. The system of claim 7, the networked computing environment comprising a cloud computing environment.

13. A computer program product for generating a pre-provisioned pool of virtual machines (VMs) in a networked computing environment, the computer program product comprising a computer readable storage device that is not a signal, and program instructions stored on the computer readable storage device, to:
calculate an install time for each software component combination in a plurality of software component combinations, the install time including an amount of time necessary to uninstall the software components from a partially provisioned VM of which the software components form a subset of VM software components and to transition the software components to a VM having the software component combination having a first plurality of software components from the partially provisioned VM having a different software component combination having a second plurality of software components that is different from the first plurality of software components;
weight each respective install time by a numerical value that indicates a probability, with respect to other software component combinations, that the software component combination will be requested based on a provisioning history;
allocate, prior to a request for software components, at least part of the first plurality of software components in the software component combinations to the pre-provisioned pool of virtual machines (VMs) based on the install time and the weigh; and
maintain diversity in the pre-provisioned pool of VMs by removing, in response to the allocating of the at least part of the first plurality of software components to the pre-provisioned pool of VMs, a VM instance having a different combination of software components from the allocated at least part of the first plurality of software components that has the first plurality of software components forming a subset of the different combination of software components from the pre-provisioned pool of VMs.

14. The computer program product of claim 13, the value associated with the provisioning history comprising a percentage of prior provisioning requests for the respective software component combination out of all prior provisioning requests.

15. The computer program product of claim 13, the plurality of software component combinations comprising all possible software component combinations.

16. The computer program product of claim 13, the plurality of software component combinations comprising a subset of all possible software component combinations, wherein the subset is randomly selected.

17. The computer program product of claim 16, the computer readable storage device further comprising instructions to perform a genetic algorithm on the subset of software component combinations that starts with a population of attempted solutions to a problem, evaluates the attempted solutions, and uses better solutions as the basis of a next generation of attempted solutions.

18. The computer program product of claim 13, the networked computing environment comprising a cloud computing environment.

19. A method for deploying a system for generating a pre-provisioned pool of virtual machines (VMs) in a networked computing environment, comprising:
deploying a computer infrastructure that executes computer instructions, the computer infrastructure performing a method of:
calculating an install time for each software component combination in a plurality of software component combinations, the install time including an amount of time necessary to uninstall the software components from a partially provisioned VM of which the software components form a subset of VM software components and to transition the software components to a VM having the software component combination having a first plurality of software components from the partially provisioned VM having a different software component combination having a second plurality of software components that is different from the first plurality of software components;
weighting each respective install time by a numerical value that indicates a probability, with respect to other software component combinations, that the software component combination will be requested based on a provisioning history associated with a provisioning history; and
allocating, prior to a request for software components, at least part of the first plurality of software components in the software component combinations to the pre-provisioned pool of virtual machines (VMs) based on the install time and the weight; and
maintaining diversity in the pre-provisioned pool of VMs by removing, in response to the allocating of the at least part of the first plurality of software components to the pre-provisioned pool of VMs, a VM instance having a different combination of software components from the allocated at least part of the first plurality of software components that has the first plurality of software components forming a subset of the different combination of software components from the pre-provisioned pool of VMs.

20. The method of claim 19, the networked computing environment comprising a cloud computing environment.

* * * * *